(12) United States Patent
Hunsinger

(10) Patent No.: US 8,470,076 B2
(45) Date of Patent: Jun. 25, 2013

(54) METHOD AND DEVICE FOR REDUCING POLYHALOGENATED COMPOUNDS IN INCINERATION PLANTS

(75) Inventor: Hans Hunsinger, Weingarten (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 1200 days.

(21) Appl. No.: 10/569,286

(22) PCT Filed: Aug. 14, 2004

(86) PCT No.: PCT/EP2004/009146
§ 371 (c)(1),
(2), (4) Date: Jun. 6, 2008

(87) PCT Pub. No.: WO2005/021136
PCT Pub. Date: Mar. 10, 2005

(65) Prior Publication Data
US 2008/0236458 A1 Oct. 2, 2008

(30) Foreign Application Priority Data
Aug. 23, 2003 (DE) .................................. 103 38 752

(51) Int. Cl.
*B01F 3/04* (2006.01)
(52) U.S. Cl.
USPC .................. 95/149; 95/206; 95/235; 422/168
(58) Field of Classification Search
USPC .......................................................... 95/235
See application file for complete search history.

(56) References Cited

U.S. PATENT DOCUMENTS

| | | | | |
|---|---|---|---|---|
| 4,069,117 A | * | 1/1978 | Cooper | 423/220 |
| 4,530,704 A | * | 7/1985 | Jones et al. | 95/180 |
| 5,582,634 A | * | 12/1996 | Burdis | 95/174 |
| 5,628,977 A | * | 5/1997 | Heisel et al. | 423/573.1 |
| 6,379,639 B2 | * | 4/2002 | Dohmann et al. | 423/210 |
| 2002/0110511 A1 | * | 8/2002 | Klingspor et al. | 423/243.08 |

FOREIGN PATENT DOCUMENTS

| | | | |
|---|---|---|---|
| DE | 40 12 887 A | | 10/1991 |
| DE | 40 12 887 A | | 10/1991 |
| DE | 44 47 583 A | | 4/1996 |
| DE | 44 47 583 A | | 4/1996 |
| DE | 198 49 021 A | | 4/2000 |
| DE | 198 49 021 A | | 4/2000 |
| DE | 19849021 A1 | * | 4/2000 |
| DE | 19849021 A1 | * | 4/2000 |
| EP | 0 435 848 A1 | | 7/1991 |
| EP | 0 547 295 A1 | | 6/1993 |

(Continued)

OTHER PUBLICATIONS

"Role of sulfur in reducing PCDD and PCDF formation" Raghunathan et al, environmental science & technology, vol. 30, No. 6, 1996.*

(Continued)

*Primary Examiner* — Robert A Hopkins
(74) *Attorney, Agent, or Firm* — Venable LLP; Robert Kinberg; Daniel A. Kopp

(57) ABSTRACT

The invention relates to a method for reducing polyhalogenated compounds in incineration plants comprising at least one combustion chamber. The aim of the invention is to provide a more efficient method. To achieve this, $SO_2$ is separated from the flue gas in at least one gas washer and is recirculated to the combustion chamber.

7 Claims, 1 Drawing Sheet

FOREIGN PATENT DOCUMENTS

| | | |
|---|---|---|
| EP | 1 271 053 A2 | 1/2003 |
| JP | 11-009962 A | 1/1999 |
| JP | 2000-015057 A | 1/2000 |
| JP | 2002-233731 A | 8/2002 |

OTHER PUBLICATIONS

"Role of Sulfur in Reducing PCDD and PCDF formation", Raghunathan et al, Environmental Science & Technology, vol. 30, No. 6, 1996.*

R. Raghunathan, et al., Role of Sulfur in Reducing PCDD and PCD Formation, *Environmental Science and Technology*, vol. 30, No. 6, Mar. 15, 1996, pp. 1827-1834, XP002310577.

R. Kager, "Betriebserfahrungen Mit Den Rauchgasentschwefelungsanlagen Der Vew AG" ("Operational Experiences with Flue Gas Desulfurizing Plants of the VEW AG"); "Staub Reinhaltung Der Luft 10" (Keeping the Air Clean of Dust 10), pp. 68-70 (1987).

International Search Report issued for PCT/EP/2004/009146 (and English Translation).

R. Kager, "Betriebserfahrungen mit den Rauchgasentschwefelungsanlagen der VEW AG" ("Operational Experiences with Flue Gas Desulfurizing Plants of the VEW AG"), *Staub Reinhaltung der Luft 10* ("Keeping the Air Clean of Dust 10"), pp. 68-70 (1987).

K. Raghunathan et al., "Role of Sulfur in Reducing PCDD and PCDF Formation", Environmental science and Technology, vol. 30, No. 6, Mar. 15, 1996, pp. 1827-1834.

English Translation of Office Action issued Nov. 24, 2009, in related Japanese Patent Application No. 2006-524282.

English Translation of Office Action issued Jun. 26, 2008 in related Japanese Patent Application No. 2006-524282.

Office Action issued Nov. 23, 2007 in related European Patent Application No. 04 764 138.6.

\* cited by examiner

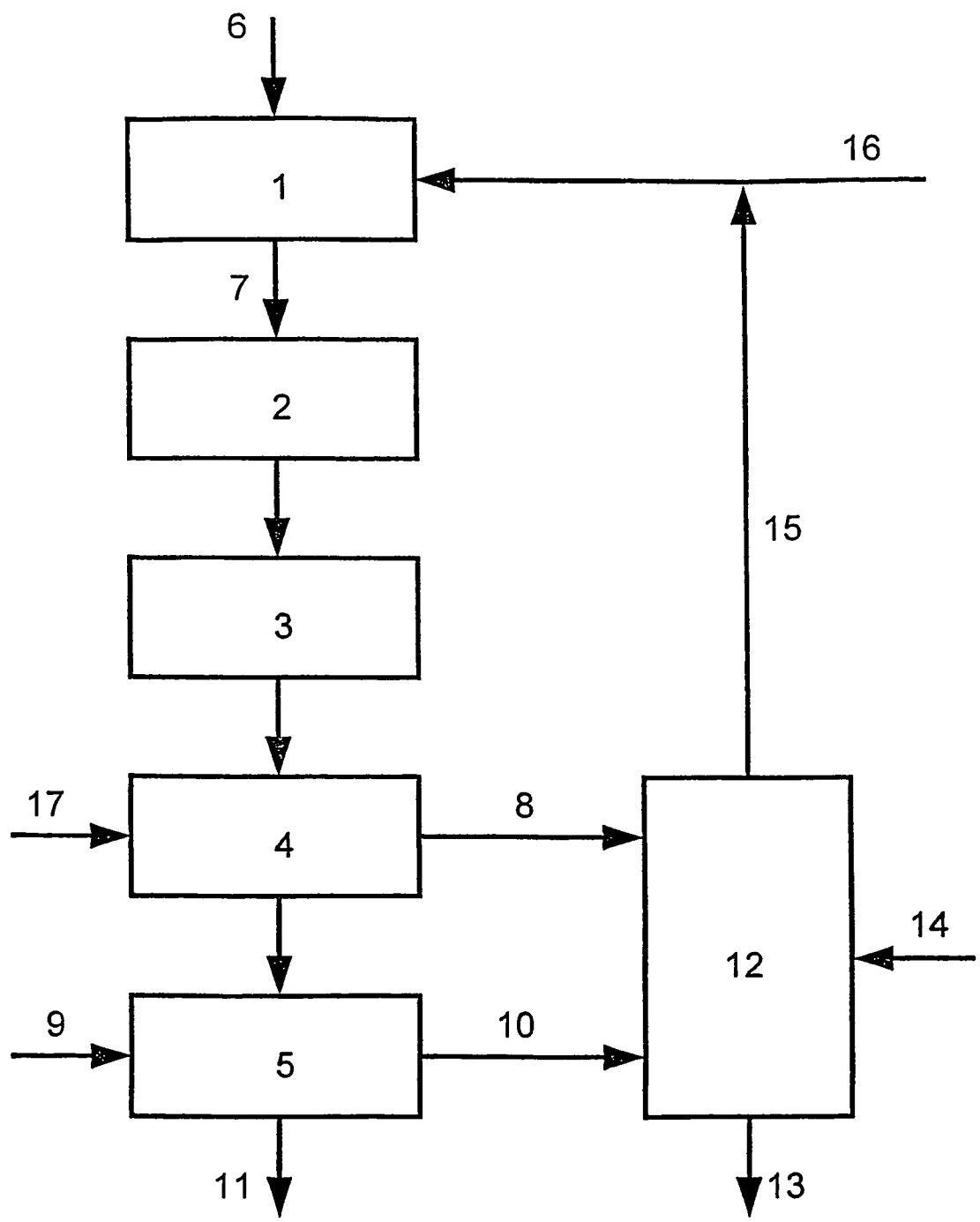

METHOD AND DEVICE FOR REDUCING POLYHALOGENATED COMPOUNDS IN INCINERATION PLANTS

The invention relates to a method and a device for reducing polyhalogenated compounds in incineration plants, provided with at least one combustion chamber as defined in patent claim one and patent claim four. The method and the device are furthermore suitable for lowering boiler corrosion by reducing the Cl content of the ash deposits produced during the plant operation.

Polyhalogenated compounds are, for example, poly-chlorinated dibenzo-p-dioxins and dibenzofurans (PCDD/F) that form during combustion processes, among other things also during the waste-material incineration, and which are released along with the waste gas. As a result of their toxicity, the legislature for the Federal Republic of Germany in the $17^{th}$ Federal Emissions Safety Regulation ($17^{th}$ BImSchV) has established a limit value for emissions of these compounds from waste incineration plants of 0.1 ng TEQ/Nm$^3$ (TEQ—toxicity equivalent). Based on the present level of knowledge, this limit value for PCDD/F emissions from incineration plants cannot be met by simply optimizing the conditions for incineration. Insofar, state of the art teaches the use of an additional, secondary flue gas cleaning to lower the PCDD/F concentration in the incineration waste gas below the prescribed value. Thus, incineration plants essentially consist of a combustion chamber, if applicable with a boiler, at least one subsequent dust collector, as well as at least one wet washer.

It is generally known from references [1] and [2] that the PCDD and the PCDF component in a waste gas can be reduced considerably by simply using an excess amount of sulfur for the combustion. In particular the ratio of sulfur dioxide to hydrochloric acid is important in that case, wherein the PCDD and PCDF component in the waste gas is reduced considerably with an increase in the ratio of sulfur dioxide to hydrochloric acid.

A method for reducing the corrosion in incineration plants is additionally disclosed in reference [3]. With this method, a partial stream of the flue gas is guided back or re-circulated into the combustion chamber, following the separating out of most of the hydrochloric acid in a first, acid-gas washing stage, by mean of a nozzle which serves to feed in a secondary gas. Owing to the low hydrochloric acid content and because the sulfur dioxide content has not yet been reduced in a second washing stage, the flue gas has a ratio of sulfur dioxide to hydrochloric acid which exceeds 1. The share of hydrochloric acid in the untreated waste gas inside the combustion chamber is consequently reduced solely by diluting it with the re-circulated waste gas.

However, extremely large amounts of re-circulated waste gas are required to achieve a noticeable change in the S/Cl ratio, which results in a considerable increase in the waste-gas volume flow in the area of the boiler and the dust collector. If no further measures are taken, this leads to a reduction in the combustion temperatures and thus to efficiency losses, wherein these could be mitigated through an additional heating of the gases fed into the combustion chamber or by adding chemicals or auxiliary agents.

Starting with the above, it is the object of the present invention to propose a device and a method for reducing polyhalogenated compounds in incineration plants with at least one combustion chamber, for which the aforementioned disadvantages or restrictions do not occur or only to a negligible degree.

This object is solved with a method having the features as defined in claim 1 and a device having the features as defined in claim 4. The dependent claims contain advantageous embodiments.

An essential and fundamental idea upon which the invention is based is that $SO_2$ is selectively separated out of the flue gas in at least one washer and is re-circulated back into the combustion chamber as $SO_2$ or sulfuric acid. As a result of the selective separating out of $SO_2$ in a washer, highly concentrated $SO_2$ or sulfuric acid and, in particular, not a diluted waste gas mixture with low $SO_2$ concentrations is advantageously available for re-circulation, which considerably reduces the aforementioned disadvantages according to prior art resulting from the extreme diluting.

The invention is explained in further detail in the following with the aid of an exemplary embodiment and the following FIGURE, wherein:

FIG. 1 shows a schematic representation of the process flows when using the method.

FIG. 1 shows that in connection with an incineration plant, the invention involves a combustion chamber 1 with an oxygen-containing primary and secondary gas feed-in 6 and/or 16, a boiler 2, or a different component part for cooling the untreated waste gas 7, as well as downstream-connected cleaning stages for the untreated waste gas. These cleaning stages comprise a dust collector 3, for example a woven filter, a first acid-gas washer 4, as well as a second neutrally operated washer 5. After passing through the cleaning stages, the cleaned waste gas 11 is vented to the outside, for example by way of a chimney. The invention furthermore relates to a reactor 12 with a carrier gas 14 supply line, a first and a second line 8 and/or 10 as connecting lines to the two washers 4 and 5, as well as two discharge lines 13 and 15, wherein the discharge line 15 is connected to the secondary feed line 16 for a connection to the combustion chamber.

Within the framework of the processing flows, a combustible material is initially burnt inside the combustion chamber 1 with a feed-in of primary gas 6. This is followed by an afterburning of any components not completely burnt, along with a feed-in of a secondary gas 16. The resulting untreated waste gas 7, which has a temperature in the range of 1000° C., is guided toward a boiler wall where it releases a certain amount of heat through heat transfer to the boiler and/or the medium inside the boiler. In the process, the untreated waste gas is cooled to temperatures ranging from 200 to 300° C. The untreated waste gas subsequently flows through the first cleaning stage and then the dust collector 3, which the waste gas for the exemplary embodiment leaves at the same temperature level and in the direction of the first washer 4.

Dioxins form primarily in the waste-gas line at a temperature level above 200° C., meaning at precisely the aforementioned temperature level for the boiler wall 2 and the dust collector 3. However, as described before, they can be reduced effectively by feeding in sulfur dioxide or even sulfuric acid, for example together with the secondary gas.

In the first acid-gas washer, hydrochloric acid is selectively separated out through absorption in water at pH values of less than 1, without this resulting in a separating out of sulfur dioxide. In addition to the water feed line 17, this washer is furthermore provided with a first line 8 for discharging hydrochloric acid in the direction of the reactor 12, as well as with a line to the second washer 5.

In contrast, the second and neutrally operated washer is used for the selective separation of sulfur dioxide from the waste gas. In addition to a feed line 9 for water-dissolved sodium hydroxide or calcium hydroxide as neutralizing agent, it also comprises a second line 10 for discharging a watery solution of sodium sulfate or sodium sulfite and/or calcium sulfate and calcium sulfite to the reactor 12, as well as a line for venting the cleaned waste gas 11.

The aforementioned sulfites are formed through reaction of sulfur dioxide with the respective hydroxides, as shown below:

$$2NaOH+SO_2 \rightarrow Na_2SO_3+H_2O \qquad (1) \text{ and/or}$$

$$Ca(HO)_2+SO_2 \rightarrow CaSO_3+H_2O \qquad (2),$$

wherein at pH values below 7 the sulfites can in part oxidize further with the oxygen in the waste gas to form sulfates, as shown below:

$$Na_2SO_3+\tfrac{1}{2}O_2 \rightarrow Na_2SO_4 \qquad (3) \text{ and/or}$$

$$CaSO_3+\tfrac{1}{2}O_2 \rightarrow CaSO_4 \qquad (4).$$

While the aforementioned sulfates are chemically stable and are therefore not available for generating sulfur dioxide in the reactor 12, the above-mentioned sulfites can enter in the reactor 12 into a reaction with the hydrochloric acids, supplied by the first washer 4, forming water and chlorides in the process, and can ultimately react to form sulfur dioxide:

$$Na_2SO_3+2HCl \rightarrow 2NaCl+SO_2(g)+H_2O \qquad (5) \text{ and/or}$$

$$CaSO_3+2HCl \rightarrow CaCl_2+SO_2(g)+H_2O \qquad (6).$$

In the same way as the aforementioned sulfates, the chlorides are no longer needed for the further cleaning process and are vented to the outside of the reactor 12 via the discharge line 13.

It is therefore critically important to adjust the oxidation rate and thus also the pH value in the second washer. The goal basically is to achieve a selective separation of sulfur compounds with high sulfite content and low sulfate component. If the pH value is noticeably below 7, the sulfites are further oxidized to form the undesirable sulfates [1]. On the other hand, pH values rising above 7 lead to an undesirable separation of carbon dioxide from the waste gas, resulting in the forming of carbonates in the washing solution:

$$2NaOH+CO_2 \rightarrow Na_2CO_3+H_2O \qquad (7) \text{ and/or}$$

$$Ca(OH)_2+CO_2 \rightarrow CaCO_3+H_2O \qquad (8).$$

In turn, this requires the additional use of neutralizing agent. Furthermore, during the mixing with HCl in the reactor, the yield of $SO_2$ would drop drastically, which is undesirable, since the HCl required for generating $SO_2$ would be used up by the competing reaction:

$$Na_2CO_3+2HCl \rightarrow 2NaCl+CO_2(g)+H_2O \qquad (9) \text{ and/or}$$

$$CaCO_3+2HCl \rightarrow CaCl_2+CO_2(g)+H_2O \qquad (10).$$

For the exemplary embodiment, a sulfur dioxide yield could be achieved in the second washer for pH values between 4 and 9, wherein a maximum yield could be observed for a pH value adjustment around 7.

Two previously mentioned substance flows leave the reactor. The stable compounds sodium chloride and sodium sulfate and/or calcium chloride or calcium sulfate, which cannot be utilized with the method according to the invention, are discharged via the discharge line 13 for a further disposal, for example to a disposal site. On the other hand, the sulfur dioxide formed in the reactor during the reactions (5) and/or (6) is re-circulated via the discharge line 15 to the combustion chamber, together with the carrier gas that is fed into the reactor via the feed line 14. It makes sense in this connection to combine the line 15 with the secondary gas feed line 16, wherein combining the line 15 and the secondary gas feed-in 16 can be configured such that a certain excess or low pressure can be generated in one of the two lines by one of the two substance flows, respectively in the other line, in order to aid the transport and/or mixing.

For one practical application, the salt residues from the two washers 4 and 5 are combined inside a small stirrer vessel, functioning as reactor 12, and are mixed together to form a solution, wherein nitrogen dispersed via the feed line 14 into the solution served as non-reactive carrier gas. The sulfur dioxide gas, released during the reaction according to equations (5) and (6), is separated out in the reactor together with the carrier-gas flow and is fed to the secondary gas feed line 16. Starting with the combustion chamber 1, the concentration of sulfur dioxide in the waste gas, increased in this way, again passes through all components until it reaches the second washer 5, where the sulfur dioxide is once more separated out selectively.

The aforementioned cyclic process leads to a step-by-step increase in the sulfur dioxide concentration in the untreated waste gas, precisely in the previously mentioned areas of dioxin formation. Under ideal conditions, the ratio of sulfur dioxide to hydrochloric acid in the untreated waste gas emitted by household waste incineration plants can be raised without auxiliary agents from a value of 0.1 to values of around 0.6, wherein an increased sulfur dioxide concentration causes a reduction of the chlorine ($Cl_2$) that is primarily responsible for the PCDD/F formation.

LITERATURE

[1] R. Kager: "BETRIEBSERFAHRUNGEN MIT DEN RAUCHGASENTSCHWEFELUNGSANLAGEN DER VEW AG" [Operational Experiences with Flue Gas Desulfurizing Plants of the VEW AG]; "STAUB REINHALTUNG DER LUFT 10" [Keeping the Air Clean of Dust 10] (1987), pp 68-70.

[2] K. Raghunathan, B. K. Gullett: Role of Sulfur in Reducing PCDD and PCDF Formation; Environ. Sci. Technol. 30 (1996), pp 1827-1834

[3] DE 198 49 021 A1

REFERENCE NUMBER LIST

1 combustion chamber
2 boiler wall
3 dust collector
4 first, acid-gas washer
5 second, neutrally operated washer
6 primary gas supply
7 untreated waste gas
8 first line for discharging hydrochloric acid
9 feed line for sodium hydroxide or calcium hydroxide
10 second line for discharging sodium sulfate or sodium sulfite and/or calcium sulfate and calcium sulfite
11 cleaned waste gas
12 reactor
13 discharge line for sodium chloride and sodium sulfate and/or calcium chloride or calcium sulfate
14 feed line for a carrier gas
15 discharge line for jointly discharging carrier gas and sulfur dioxide
16 secondary gas feed line
17 feed line for water

The invention claimed is:

1. A method for reducing the formation of polyhalogenated compounds in an incineration plant, comprising the steps of:

(i) selectively and chemically separating sulfur dioxide ($SO_2$) from a flue gas in at least one washer forming inorganic sulfur compounds;

(ii) chemically recovering highly concentrated $SO_2$ or sulfuric acid from a scrubbing solution of the at least one washer;

(iii) re-circulating the recovered $SO_2$ or sulfuric acid into a combustion chamber of the incineration plant located upstream of the at least one washer; and (iv) repeatedly cycling steps (i)-(iii), thereby forming a process-internal $SO_2$ or $SO_2$/sulfuric acid circuit resulting in increased local $SO_2$ concentrations in the flue gas between the combustion chamber and the at least one washer, compared to local $SO_2$ concentrations in the absence of steps (i)-(iv).

2. The method as defined in claim 1 further comprising the steps of:

separating hydrochloric acid out of the flue gas in a first, acid-gas washer by adding water, separating $SO_2$ out of the flue gas in a second, neutrally operated washer by adding water, as well as at least one of sodium hydroxide and calcium hydroxide, wherein at least one of (a) sodium sulfate in combination with sodium sulfite and (b) calcium sulfate in combination with calcium sulfite, dissolved in water, are formed as a solution in the process;

combining the hydrochloric acid and at least one of the (a) sodium sulfate solution in combination with the sodium sulfite solution and the (b) calcium sulfate solution in combination with the calcium sulfite solution, in a reactor, to cause in a chemical reaction and the forming of sodium chloride and calcium chloride, as well as the release of sulfur dioxide gas;

feeding an inert carrier gas into the reactor to be charged by the sulfur dioxide gas;

guiding the resulting sulfur dioxide-charged carrier gas from the reactor to the combustion chamber; and discharging at least one of the (c) sodium chloride in combination with the sodium sulfate and the (d) calcium chloride in combination with calcium sulfate from the reactor.

3. The method as defined in claim 2, further comprising the step of combining a secondary gas with the carrier gas and the sulfur dioxide in a region between the reactor and the combustion chamber.

4. A device for reducing the formation of polyhalogenated compounds in an incineration plant, said device comprising:

at least one combustion chamber including a first acid-gas washer with a first discharge line to discharge hydrochloric acid, and a second, neutrally operated washer, arranged downstream of the first washer, with a first feed line to supply at least one of sodium hydroxide or calcium hydroxide and a second discharge line to discharge at least one of (a) sodium sulfite in combination with sodium sulfate and (b) calcium sulfite in combination with calcium sulfate; and a reactor into which the first and second discharge lines empty, wherein the reactor further includes a second feed line to supply an inert carrier gas, a third discharge line to discharge at least one of (c) sodium chloride in combination with sodium sulfate and (d) calcium chloride in combination with calcium sulfate; and a connecting line, located between the reactor and the combustion chamber, to guide the carrier gas and the sulfur dioxide from the reactor to the combustion chamber.

5. The device according to claim 4, wherein the connecting line includes a feed-in location for feeding in the secondary gas.

6. The device according to claim 5, wherein the feed-in location empties in the direction of the combustion chamber into the connecting line.

7. The device according to claim 4, wherein the connecting line empties in the region of a waste gas burn-out zone into the combustion chamber.

* * * * *

UNITED STATES PATENT AND TRADEMARK OFFICE
CERTIFICATE OF CORRECTION

| | | |
|---|---|---|
| PATENT NO. | : 8,470,076 B2 | Page 1 of 1 |
| APPLICATION NO. | : 10/569286 | |
| DATED | : June 25, 2013 | |
| INVENTOR(S) | : Hunsinger | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1988 days.

Signed and Sealed this
Seventeenth Day of February, 2015

Michelle K. Lee
*Deputy Director of the United States Patent and Trademark Office*